June 7, 1938.   L. A. MAJNERI   2,120,073
FLUID PRESSURE CONTROL MECHANISM
Filed Jan. 8, 1936
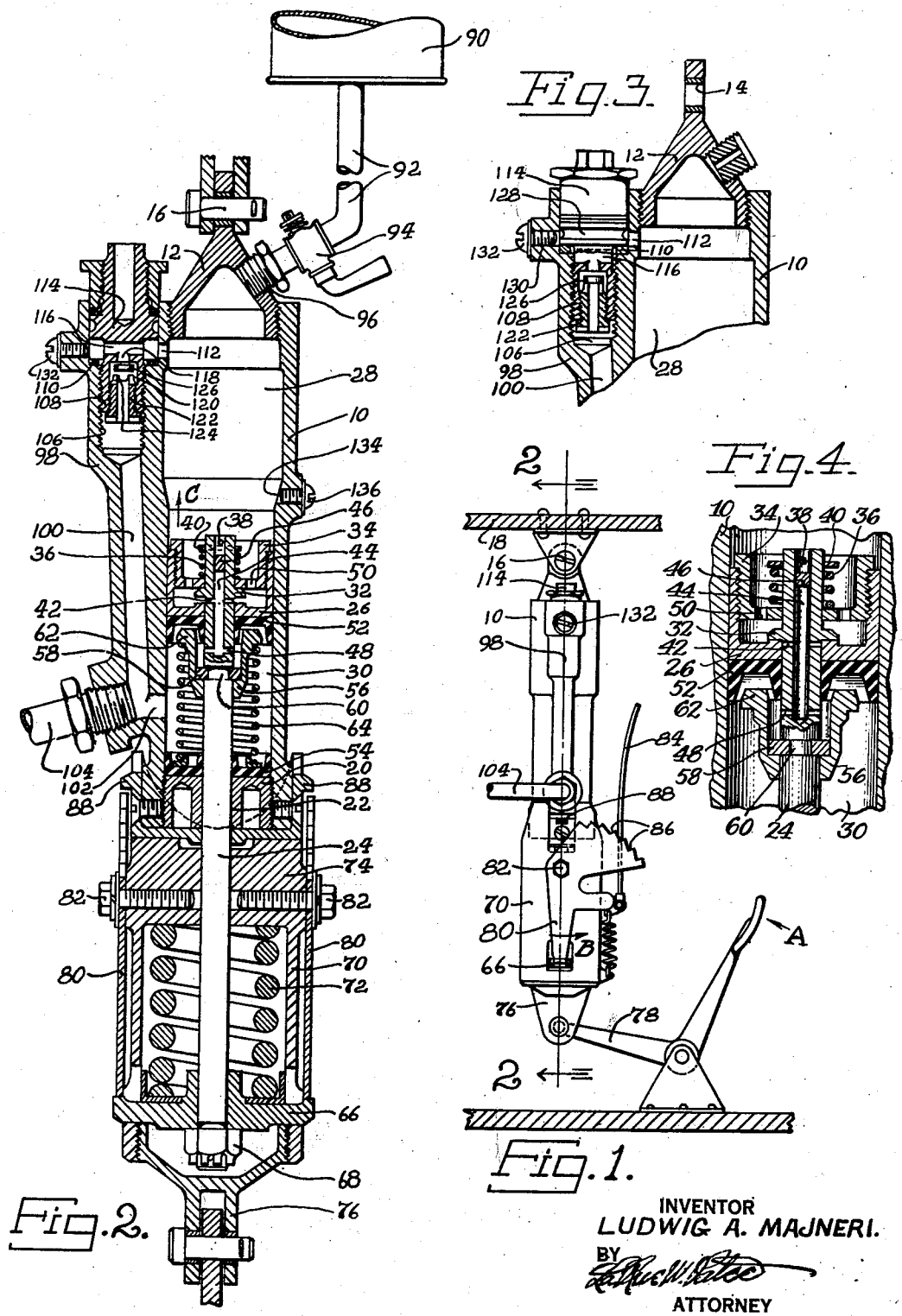
INVENTOR
LUDWIG A. MAJNERI.
BY
ATTORNEY

Patented June 7, 1938

2,120,073

UNITED STATES PATENT OFFICE 2,120,073

FLUID PRESSURE CONTROL MECHANISM

Ludwig A. Majneri, Grosse Pointe, Mich.

Application January 8, 1936, Serial No. 58,037

2 Claims. (Cl. 60—54.6)

This invention relates to a fluid pressure control mechanism and is specifically illustrated as embodied in a control mechanism for hydraulic brakes particularly applicable to airplanes.

An object of the invention is to provide a reciprocating piston in a cylinder which forms a common end wall for a reserve chamber at one side of the piston and a pressure chamber at the other side of the piston, and to provide a bypass from the reserve chamber to the pressure chamber which serves a two-fold purpose. One of these purposes is to provide a communication from the reserve chamber to the pressure chamber so that the latter chamber is at all times filled with fluid, and the other of said purposes is to provide a one-way passage for the fluid from the reserve chamber to the pressure chamber serving as a means for bleeding the hydraulic braking system so that all air which might be in the fluid is removed from the pressure chamber.

Other objects and advantages of the invention will more fully appear from the following description taken in connection with the accompanying drawing, in which:

Fig. 1 is a side elevation of my improved device mounted for operation.

Fig. 2 is a vertical sectional view of the mechanism shown in Fig. 1, taken on the line 2—2 thereof, and showing the parts of the bypass in position for bleeding the system.

Fig. 3 is a fragmentary sectional view corresponding to the upper portion of Fig. 2, the parts being shown in normal operative position.

Fig. 4 is a fragmentary sectional view of the piston shown in Fig. 2 in a position occupied by movement of the piston rod in a direction opposite to that shown by arrow C in Fig. 2.

Referring to the drawing, I have shown a cylinder 10 which is closed at its upper end by a screw threaded plug 12 having an opening 14 therein for the reception of a securing means 16 pivotally securing the mechanism to a support 18. The opposite end of the cylinder 10 is provided with a plug 20 screw threaded into the open end thereof. An opening 22 is provided in the plug 20 through which extends a piston rod 24 having a piston 26 secured on the upper end thereof. The piston 26 forms a common end wall for a reserve chamber 28 at the upper end of the cylinder 10 and a pressure chamber 30 at the lower end thereof. The rod 24 at its upper end has a radially extending flange 32 upon which seats a screw threaded cap member 34 resiliently held against the seat by a spring 36 held on the end of the rod 24 by a pin and washer 38 and 40 respectively. The head of the piston is slidably mounted on the rod 24 below the radially extending flange 32 and the skirt portion thereof is screw threaded to receive the cap member 34. It will be noted that the head of the cap 34 and the head of the piston 26 are spaced on the opposite sides of the radially extending flange 32, the latter forming a stop for relatively axial movement between the rod and piston. The spring 36 normally holds the piston in a downward position relative to the rod 24, providing a space between the radially extending flange 32 and the head of the piston.

A radially extending opening 42 is provided in the rod 24 just below the radially extending flange 32 so that when the piston is in the position shown in Fig. 2 fluid in the space between the head of the cap 34 and the head of the piston 26 may enter through the opening 42 into an axially extending passage 44 in the rod 24, the passage 44 being closed by a plug 46 at its upper end. The lower end of the passage 44 communicates with a radially extending passage 48 through the rod 24 conducting the fluid into the working chamber at the opposite side of the piston 26. Openings 50 are provided in the head of the cap 34 to conduct fluid from the reserve chamber 28 into the space between the head of the cap 34 and the head of the piston 26. Suitable fluid sealing gaskets 52 and 54 are provided, the gasket 52 forming a seal for the piston 26 and the gasket 54 forming a seal for the rod 24 extending through the plug 20. A collar 56 is provided on the rod 24 and is held in position by a C-shaped washer 58 which is received in a groove 60 on the rod 24. The upper end of the collar 56 is provided with a radially extending flange 62 forming an abutment for a compression spring 64 seated against the sealing gasket 54.

The lower end of the rod 24 is provided with a collar 66 held in place by a nut 68. Mounted on the rod 24 between the lower end of the cylinder 10 and the collar 66 is a reciprocating member 70 urged upwardly by a coil spring 72. The member 70 is in the form of a cylinder having a head portion 74 at its upper end and a screw threaded opening at its lower end. A head 76 is threaded into the opening at the lower end and serves as an attaching means for an operating lever 78. On opposite sides of the member 70 I have provided a pair of swinging arms 80 pivotally secured to the head 74 by bolts 82 which, in normal position, as shown in Fig. 1, serve as a rigid connection between the head 74 and the collar 66.

In the operation of the mechanism just described, a pressure on the lever 78 in the direction of the arrow A causes a downward movement of the head 76, which movement is transmitted through arms 80 to the collar 68 which in turn applies a downward pressure to the piston rod 24, causing the collar 32 to engage the head of the piston 26 closing the opening 42, and further movement of the rod 24 pulls the piston downwardly, applying pressure to the fluid in the chamber 30. If it is desired to retain this pressure after releasing the pressure on the lever 78, the arms 80 are swung in a direction indicated by the arrow B by an actuating member 84, whereupon one of a plurality of notches 86 is positioned against a shoulder 88 serving as a means to space the head 74 from the lower end of the cylinder 10, holding the spring 72 in compressed position. It will be understood that the spring 72 in compressed position retains the fluid in the chamber 30 under pressure.

As a source of supply for the reserve chamber 28, I have illustrated a container 90 having a conduit 92 provided with a valve 94 communicating with the chamber 28 by a suitable fitting 96 screw threaded into the plug 12.

Formed at a side of the casing 10 is an enlarged portion 98 having a vertically extending passage 100 at the lower end of which is a radially extending passage 102 communicating with the pressure chamber 30, and approximately in axial alignment with the radially extending passage 102 I have provided a pressure outlet passage 104 which may be connected to the brake operating mechanism, not shown. At the upper end of the passage 100 I have provided an enlarged portion which is screw threaded as at 106 to receive a fitting 108. The upper and outer end of the passage 100 is further enlarged providing a shoulder 110. In the latter enlarged portion and immediately above the shoulder 110 is a radially extending opening 112 communicating with the reserve chamber 28. The fitting 108 has an enlarged portion 114 above the lower screw threaded portion and a radially extending passage 116 is formed immediately below the enlarged portion 114. The lower end of the fitting 108 has an axially extending passage 118 which intersects the passage 116, being axially bored out forming a chamber 120 for receiving a tubular member 122 having a slot 124 at its upper end. The member 122 is screw threaded into the walls of the chamber 120 and terminates below the upper end of the chamber 120, forming a space for a flat disc valve 126.

As illustrated in Fig. 2, it will be noted that there is a passage from the reserve chamber 28 through opening 112, passages 116, 118 to chamber 120, through slots 124, through the fitting 122 into the passage 100, and through passage 102 into the pressure chamber 30. The valve 126, however, being loosely mounted in the chamber 120, prevents the flow of fluid in the opposite direction by its engagement with the upper end of the walls of the chamber 120, sealing off the passage 118. This mechanism is shown in a position for bleeding the system. When the piston 26 is moved in a direction indicated by the arrow C, excess fluid is drawn from the reserve chamber 28 to the pressure chamber 30 but the chamber 30 is substantially filled by the fluid return from the system through passage 104, and when the piston is moved in the opposite direction the fluid in the chamber 30 is prevented from returning to the reserve chamber 28 by the valve 126 and is forced out through the passage 104.

Thus, the device operates in the form of a pump. When movement in direction of arrow C occurs the openings 42 are uncovered and any air in chamber 30 is permitted to escape into the reserve chamber 28, while during movement in the opposite direction the openings 42 are closed by flange 32 contacting the piston 26. It will be understood that the container 90 is applied only during the bleeding operation.

When it is desired to bleed the system, that is remove the air therefrom, the fitting 108 is unscrewed from the position shown in Fig. 3 to the position shown in Fig. 2 providing an opening from the chamber 28 through openings 112, 118, 124 and 100 into the passage 104 to the hydraulic system. The piston 26 is then moved upwardly forcing the fluid in the reserve chamber 28 through the aforesaid passages into the system, it being understood that the system is open so that fluid is drained therethrough carrying with it any air which might be in the lubricant, it not returning to either of the chamber 28 or 30. The piston 26 is then moved downwardly forcing the lubricant in the pressure chamber 30 through opening 102 to passage 104 and at the same time lubricant is supplied to the reserve chamber 28 from the container 90. This operation is repeated until the entire system is filled with lubricant. It will be understood that when the piston 26 moves downwardly the valve 126 closes so that the piston does not draw lubricant from the system through passages 104, 100, 118 and 112.

When the upper portion 114 of the fitting 108 is screwed down on the shoulder 110, as shown in Fig. 3, the fluid from the reserve chamber 28 is shut off so that it cannot pass through the openings 118 and 116. An annular groove 128 is provided in the portion 114 of the fitting 108 to form a means for conducting fluid from the reserve chamber 28 through the opening 112, and when this fitting is in the position shown in Fig. 3 the groove 128 registers with an opening 130 closed by a removable plug 132. This provides a means for testing the high level of the fluid in the reserve chamber 28. Another opening 134 is provided in the wall of the cylinder 10 which is closed by a removable plug 136, providing a means for indicating the low level of the fluid in the reserve chamber 28.

Various changes, including the size, shape and arrangement of parts, may be made without departing from the spirit of my invention, and it is not my intention to limit the scope thereof other than by the terms of the appended claims.

What I claim is:

1. In a fluid pressure control mechanism, the combination of a pressure chamber having a pressure discharge passage and a reserve chamber having a fluid supply passage, a bypass forming a communication between said chambers, an internally threaded chamber in said bypass, an open end chamber in axial alignment with said threaded chamber, a shoulder between said threaded chamber and said open end chamber, a fitting having an axially extending passage in one end thereof and a radially extending passage communicating therewith said fitting being screw threaded into said threaded chamber through said open end chamber and having an enlarged closed outer portion beyond said radially extending passage for engagement with said shoulder, and a one-way valve in the axially extending passage of said fitting.

2. In a fluid pressure control mechanism, the combination of a pressure chamber and a reserve chamber in vertical alignment, a reciprocating piston forming a common end wall between said chambers, a bypass having a vertically extending passage and horizontally arranged end passages communicating respectively with said chambers, said vertically extending passage extending beyond the horizontal passage leading to said reserve chamber and open at its upper end, said vertically extending passage being reduced in diameter to form a shoulder below the horizontal passage and being screw threaded, a fitting having an outer portion fitting the outer open end of said vertically extending passage and a portion of smaller diameter screw threaded into the reduced diameter of said vertically extending passage, a vertical passage in said last named portion of said fitting terminating in a horizontal passage adjacent the juncture of said portions, and a one-way valve in the passage in said fitting.

LUDWIG A. MAJNERI.